United States Patent [19]

Muraoka et al.

[11] Patent Number: 5,604,045
[45] Date of Patent: Feb. 18, 1997

[54] MAGNETIC HEAD

[75] Inventors: Shunsaku Muraoka, Hirakata; Akinaga Natsui, Neyagawa; Yasuhiro Nakatani, Kawachinagano, all of Japan

[73] Assignee: Matsushita Electric Industrial Co., Ltd., Osaka-fu, Japan

[21] Appl. No.: 550,282

[22] Filed: Oct. 30, 1995

Related U.S. Application Data

[63] Continuation of Ser. No. 135,449, Oct. 13, 1993, abandoned.

[30] Foreign Application Priority Data

Oct. 13, 1992 [JP] Japan .................. 4-274000

[51] Int. Cl.⁶ .................. G11B 5/66; G11B 5/147; B32B 9/00
[52] U.S. Cl. .................. 428/692; 428/336; 428/694 R; 428/694 T; 428/694 TM; 428/694 TS; 428/900; 360/126
[58] Field of Search .................. 428/692, 900, 428/694 R, 694 T, 694 TM, 694 TS, 336; 360/126

[56] References Cited

FOREIGN PATENT DOCUMENTS 71403  3/1991  Japan .

OTHER PUBLICATIONS

N. Kaminaka et al., "Co-based Superstructured Nitride Alloy Films . . . ," IEEE Transactions on Magnetics, vol. 26, No. 6, pp. 2936–1941 (Nov. 1990).

C. S. Tsai et al., "High Frequency Characteristics of Annealed Co-base Amorphous Alloy Ribbons," J. Appl. Phys., vol. 70, No. 10, pp. 5846–5848 (Nov. 15, 1991).

Y. Omata et al., "Initial Permeability of Co-based Amorphous Films at High Frequencies," IEEE Translation Journal on Magnetics in Japan, vol. 4, No. 8, pp. 518–525 (Aug. 1989).

T. Takahashi et al., "Annealing Dependence of Coercivity, Anisotropy Field, and Resistivity . . . ," J. Appl. Phys., vol. 69, No. 8, pp. 5011–5013 (Apr. 15, 1991).

M. Miura et al., "Annealing Behavior of Magnetic Anisotropy in CoNbZr Films," IEEE Transactions on Magnetics, vol. 24, No. 5, pp. 2215–2220 (Sep. 1988).

T. Jagielinski, "Trends in Materials Development for Magnetic Recording Heads," Materials Science & Engineering B, vol. B3, No. 4, pp. 467–471 (Sep. 1989).

Primary Examiner—Leszek Kiliman
Attorney, Agent, or Firm—Wenderoth, Lind & Ponack

[57] ABSTRACT

A ring-type magnetic head is of a structure in which a metallic magnetic film is sandwiched between two substrates, and the metallic magnetic film has a saturation magnetic field not less than 50 A/m in all directions parallel to a film plane thereof; the direction of lamination of the sandwich is generally perpendicular to a gap-forming surface of the head; where the metallic magnetic film is a Co-containing magnetically soft film having a crystallization temperature Tx greater than the Curie temperature Tc, the metallic magnetic film is subjected to a first heat treatment at a temperature not less than Tc and a second heat treatment at a temperature Ta of $Tc-180°C. \leq Ta \leq Tc-30°C.$ in the absence of any applied magnetic field; where the metallic magnetic film is a Co-containing magnetically soft film having a crystallization temperature Tx less than the Curie temperature Tc, the metallic magnetic film is subjected to a first heat treatment at a temperature not greater than Tx while a rotating magnetic field is being applied thereto and a second heat treatment at a temperature Ta of $Tx-200°C. \leq Ta \leq Tx-50°C.$ in the absence of any applied magnetic field.

6 Claims, 10 Drawing Sheets

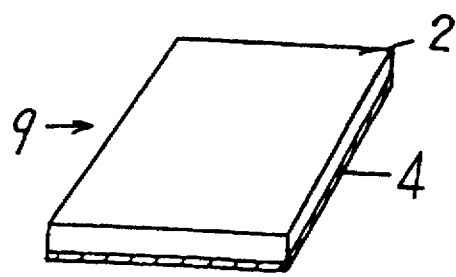
Fig. 11
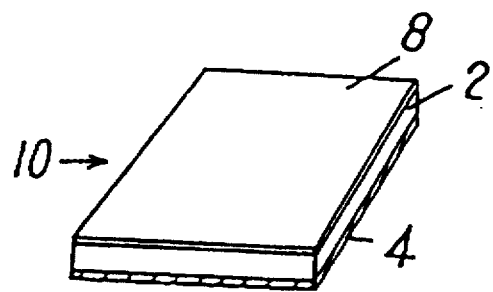
Fig. 12
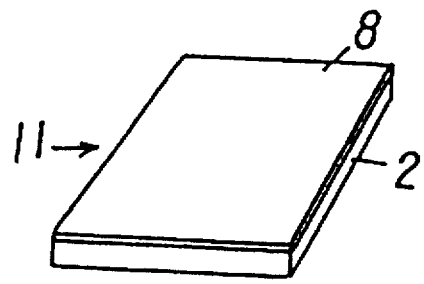
Fig. 13
Fig. 14
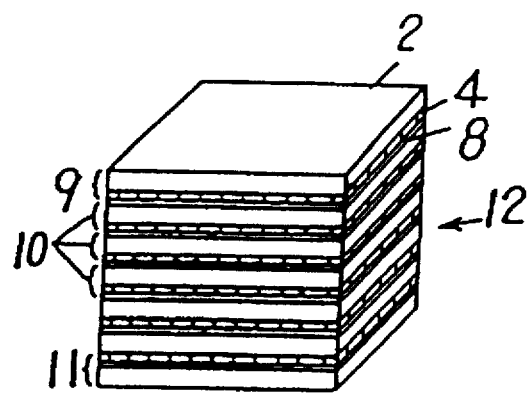

5,604,045

MAGNETIC HEAD

This application is a Continuation of now abandoned application Ser. No. 08/135,449, filed Oct. 13, 1993.

BACKGROUND OF THE INVENTION

1. Field of the Invention

The present invention relates to a high-frequency magnetic head suited for use in recording and reproducing high-frequency signals which are generally employed in high-quality VTR, digital VTR or the like.

2. Description of the Prior Art

Development of ring-type magnetic heads is being pursued by the use of metallic magnetic material such as, for example, sendust or an amorphous alloy. The high-frequency magnetic heads can be obtained by reducing the loss of eddy currents in a high-frequency region of a magnetic core made of the metallic magnetic material. To this end, the magnetic core has a metallic magnetic film of a laminated structure in which metallic magnetic thin layers and insulating layers are alternately laminated one upon another.

It is preferred that the metallic magnetic film of the ring-type magnetic head is an isotropic film having a small anisotropy. In applications where the amorphous alloy is employed as the metallic magnetic material, magnetic anisotropy is generally induced therein in the presence of a magnetic field. It is, therefore, necessary to make the metallic magnetic film isotropic by reducing the magnitude of the induced magnetic anisotropy during the manufacture of the magnetic head. Accordingly, a heat treatment required for the manufacture of the magnetic head is generally carried out in a rotating magnetic field at a temperature of less than a crystallization temperature Tx where formation of a Co-containing magnetically soft film having composition of the crystallization temperature Tx less than the Curie temperature Tc is desired, and in the absence of any applied magnetic field at a temperature of from Tc to Tx where formation of a Co-containing magnetically soft film having composition of a crystallization temperature Tx greater than Tc is desired, thereby dispersing the anisotropy.

However, because such an isotropic Co-containing magnetically soft film has relatively small local anisotropic magnetic fields, the initial permeability in a high-frequency region (for example, over 30 MHz) is deteriorated by the action of natural resonance. Even if the thickness of each of the layers of the laminated film is made thin, the initial permeability is not improved in the high-frequency region and, hence, has a limit in this region. Because of this, the problem arises that the magnetic head has a limit in high-frequency characteristics, and the present condition is that conventional magnetic heads cannot satisfy requirements of, for example, a high-quality digital VTR system in which the high-frequency characteristics are required in the range of not less than 30 MHz.

SUMMARY OF THE INVENTION

The present invention has been developed to overcome the above-described disadvantages.

It is accordingly an object of the present invention to provide an improved ring-type magnetic head having superior high-frequency characteristics.

Another object of the present invention is to provide the ring-type magnetic head of the above-described type which has a simple structure and can be readily manufactured at a low cost.

In accomplishing the above and other objects, the ring-type magnetic head according to the present invention comprises a metallic magnetic film having first and second surfaces opposite to each other, and first and second substrates bonded to the first and second surfaces of the metallic magnetic film, respectively, wherein the metallic magnetic film has a saturation magnetic field not less than 50 A/m in all directions parallel to a film plane thereof.

Preferably, the metallic magnetic film comprises a Co-containing magnetically soft film.

Because the magnetic head according to the present invention is a ring-type one, the magnetic film employed therein must be isotropic as a whole in directions parallel to a film plane thereof.

FIG. 2a is a graph indicating B-H loops of various magnetic domains of a magnetic film which is as a whole substantially isotropic in the directions parallel to the film plane thereof in which anisotropy is dispersed (this film is hereinafter referred to as an in-plane isotropic film). The dispersed anisotropy provides the magnetic film with a number of axes 18 of easy magnetization substantially in all directions. Accordingly, a combined B-H loop of such a magnetic film can be obtained by summing up all of the B-H loops shown in FIG. 2a and is indicated in FIG. 2b. Because of this, the in-plane isotropic film shows the B-H loop as shown in FIG. 2b substantially in all directions parallel to the film plane and, hence, a saturation magnetic field Hs in the B-H loop of the isotropic film in which anisotropy is dispersed becomes equal to a locally anisotropic magnetic field Hk of one of local regions (within magnetic domains). Although ordinary in-plane isotropic films are obtained by heat-treating them at a temperature not less than the Curie temperature or in a rotating magnetic field, they generally have a small locally anisotropic magnetic field Hk and a small saturation magnetic field Hs=20–40 A/m.

FIGS. 3a to 3c are graphs indicating B-H loops of in-plane isotropic Co-containing amorphous films having different saturation magnetic fields Hs and a thickness of 2 μm. FIG. 3a is a graph obtained by rendering the isotropic saturation magnetic field Hs to be equal to 68 A/m with the use of the method according to the present invention. FIG. 3b is a graph obtained by rendering the isotropic saturation magnetic field Hs to be equal to 32 A/m through a heat treatment carried out at a temperature not less than the Curie temperature. FIG. 3c is a graph obtained by rendering the isotropic saturation magnetic field Hs to be equal to 28 A/m through a heat treatment carried out in a rotating magnetic field.

FIG. 4 is a graph indicating frequency characteristics of the initial permeability of these films. It can be known from this graph that the initial permeability increases at frequencies not less than 30 MHz with an increase of the saturation magnetic field Hs. The reason for this is that the natural resonance frequency increases with an increase in local anisotropy. In this way, the high-frequency characteristics of the initial permeability can be improved isotropically in directions parallel to the film plane by increasing the local anisotropy.

FIG. 5 is a graph indicating frequency characteristics of the initial permeability of in-plane isotropic Co-containing amorphous films having different thicknesses where the isotropic saturation magnetic field Hs was rendered to be nearly equal to 20 A/m by a heat treatment carried out in a rotating magnetic field. FIG. 6 is a graph indicating frequency characteristics of the initial permeability of the above in-plane isotropic Co-containing amorphous films where the isotropic saturation magnetic field Hs was rendered to be nearly equal to 40 A/m by a heat treatment carried out at a temperature not less than the Curie temperature. FIG. 7 is a graph indicating frequency characteristics of the initial permeability of the above in-plane isotropic Co-containing amorphous films where the isotropic saturation magnetic field Hs was rendered to be nearly equal to 70 A/m in accordance with the method according to the present invention. It can be known from these graphs that as the isotropic saturation magnetic field Hs increases, the initial permeability tends to increase at high-frequencies not less than 30 MHz. It can be also known that the initial permeability increases at high-frequencies with a reduction in layer thickness. The reason for this is that the natural resonance frequency increases with an increase in local anisotropy of the magnetic film, and the loss of eddy currents becomes more dominant, as a factor for restricting the high-frequency characteristics of the initial permeability, than the natural resonance.

FIG. 1a depicts a ring-type magnetic head of a structure in which a metallic magnetic film 8 is sandwiched between two substrates 2. The metallic magnetic film 8 is a laminated film having a plurality of metallic magnetic layers 1 and a plurality of insulating layers 3 laminated alternately with the metallic magnetic layers 1. The metallic magnetic film 8 is deposited on one of the two substrates 2 and is bonded to the other substrate 2 using an adhesive glass 4. It is clear from FIG. 1a that the direction of lamination of the sandwich formed by the metallic film and the two substrate is generally perpendicular to a gap-forming surface of the head.

FIG. 1b schematically depicts a magnetic domain structure of a portion of the metallic magnetic film 8 indicated by A in FIG. 1a. As shown by 7 in FIG. 1b, one magnetic domain has local anisotropy.

FIG. 8 is a graph indicating relative outputs of magnetic heads at a frequency of 80 MHz where the isotropic saturation magnetic field Hs of the metallic magnetic film was changed. Furthermore, the thickness of each of the metallic magnetic layers was so changed as to be 1.5 μm, 2 μm, 3.5 μm, 5 μm, and 7 μm.

As can be known from this graph, the magnetic head having the metallic magnetic layers of not less than 5 μm provides a substantially constant relative output, regardless of the magnitude of the isotropic saturation magnetic field Hs. On the other hand, the magnetic head having the metallic magnetic layers of not greater than 3.5 μm provides a high relative output when the Hs exceeds 50 A/m. This phenomenon becomes conspicuous with a reduction in layer thickness. It is conceivable that the reason for this is that the initial permeability of the magnetic film at high frequencies, on which the head characteristics greatly depend, was improved as shown in FIG. 7 with an increase in the isotropic saturation magnetic field of the magnetic film.

FIG. 9 is a graph indicating a change of the isotropic saturation magnetic field Hs relative to Ta at which a Co-containing amorphous film (Saturation magnetic flux density Bs=0.8 T, Curie temperature Tc=480° C., Crystallization temperature Tx=575° C.) having a crystallization temperature Tx greater than the Curie temperature Tc was heat-treated in the absence of any applied magnetic field. At initial stages, the Co-containing amorphous film was subjected to a heat treatment at 480° C. equal to the Curie temperature in the absence of any applied magnetic field. The Hs increases with the heat-treatment temperature Ta and starts decreasing at 480° C. The increase in Hs is due to an increase in local anisotropy within the magnetic domains resulting from the heat treatment carried out at a temperature of not greater than Tc in the absence of any applied magnetic field. When Tc-180° C.≦Ta≦Tc-30° C., the Hs becomes a value not less than 50 A/m (Hs≧50 A/m).

FIG. 10 is a graph indicating a change of the isotropic saturation magnetic field Hs relative to Ta at which a Co-containing amorphous film (Bs=0.9 T, Tx=500° C.) having a crystallization temperature Tx less than the Curie temperature Tc was heat-treated in the absence of any applied magnetic field. At initial stages, the Co-containing amorphous film was subjected to a heat treatment at Ta=450° C. in a rotating magnetic field. The Hs increases with the heat-treatment temperature Ta. When Tx-200° C.≦Ta≦Tx-50° C. the Hs becomes a value not less than 50 A/m (Hs≧50 A/m). It is conceivable that the increase in Hs is due to an increase in induced magnetic anisotropy within the magnetic domains, which increase is caused by a magnetic field inside each of the magnetic domains and results from a heat treatment in the presence of the magnetic domain structure.

As discussed hereinabove, the ring-type magnetic head having the laminated metallic magnetic film of a thickness not greater than 3.5 μm shows superior high-frequency characteristics as compared with the conventional one by rendering the metallic magnetic film to have the isotropic saturation magnetic field Hs≧50 A/m.

When a Co-containing magnetically soft film having a crystallization temperature greater than the Curie temperature (Tx>Tc) is employed as the metallic magnetic film, the anisotropic magnetic field of each of the magnetic domains which are generally isotropic as a whole can be enlarged by: opposing a pair of core elements with respective magnetic gap forming surfaces directed to each other; preparing a gapped bar by heat-treating the paired core elements at a temperature of not less than Tc; and heat-treating the gapped bar at a temperature of Tc-180° C≦Ta≦Tc-30° C. in the absence of any applied magnetic field. On the other hand, when a Co-containing magnetically soft film having a crystallization temperature less than the Curie temperature (Tx<Tc) is employed as the metallic magnetic film, such an anisotropic magnetic filed can be enlarged by: opposing a pair of core elements with respective magnetic gap forming surfaces directed to each other; preparing a gapped bar by heat-treating the paired core elements at a temperature not greater than Tx while applying a rotating magnetic field to the magnetic film; and heat-treating the gapped bar at a temperature of Tx-200° C.≦Ta≦Tx-50° C. in the absence of any applied magnetic field.

BRIEF DESCRIPTION OF THE DRAWINGS

The above and other objects and features of the resent invention will become more apparent from the following description of a preferred embodiment thereof with reference to the accompanying drawings, throughout which like parts are designated by like reference numerals, and wherein:

FIG. 1b is a schematic view of a magnetic domain structure of a portion indicated by A in FIG. 1a;

FIG. 2b is a graph indicating a combined B-H loop of the B-H loops shown in FIG. 2a;

FIG. 11 is a perspective view of a first substrate constituting a laminated core block;

FIG. 12 is a perspective view of one of a plurality of second substrates constituting the laminated core block;

FIG. 13 is a perspective view of a third substrate constituting the laminated core block;

FIG. 14 is a perspective view of the laminated core block;

DETAILED DESCRIPTION OF THE PREFERRED EMBODIMENTS

Figure 1A:
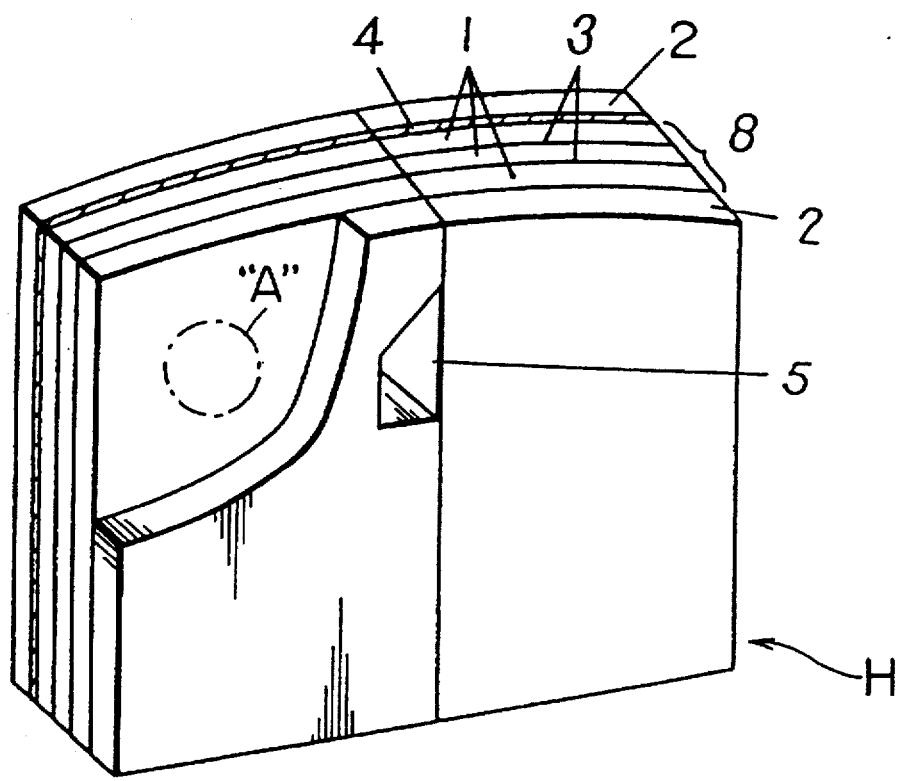
FIG. 1a is a perspective view of a magnetic head according to the present invention.

Referring now to the drawings, there is shown in FIG. 1a a magnetic head H embodying the present invention, which comprises a metallic magnetic film 8 and two ceramic substrates 2 containing magnesium titanate between which the metallic magnetic film 8 is sandwiched. The metallic magnetic film 8 is firmly bonded to the substrates 2, and bonding of the former to one of the latter is carried out using an adhesive glass 4. The metallic magnetic film 8 is made up of a plurality of metallic magnetic layers 1 made of a Co-containing amorphous alloy and a plurality of insulating layers 3 made of SiO2 and alternately laminated with the magnetic layers 1. The magnetic head H has a coil window 5 defined therein through which a coil (not shown) is wound around each core half. The direction of lamination of the sandwich formed by the metallic metal film and the two substrates is clearly generally perpendicular to a gap forming surface of the head.

In FIG. 1a, although the magnetic head according to the present invention is illustrated as having the plurality of metallic magnetic layers 1 and the plurality of insulating layers 3, the magnetic head may have only one metallic magnetic layer and no insulating layer.

Figure 1B:
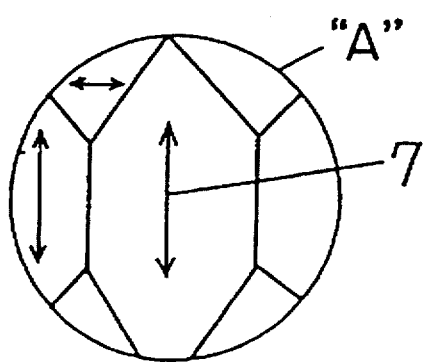
Figure 2A:
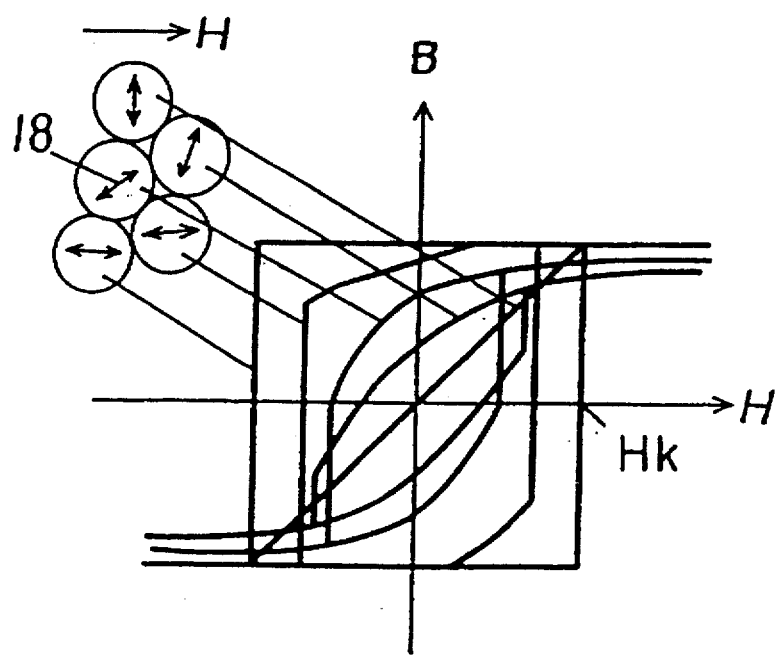
FIG. 2a is a graph indicating B-H loops of various magnetic domains of a magnetic film which is as a whole substantially isotropic in directions parallel to a film plane thereof in which anisotropy is dispersed.
Figure 2B:
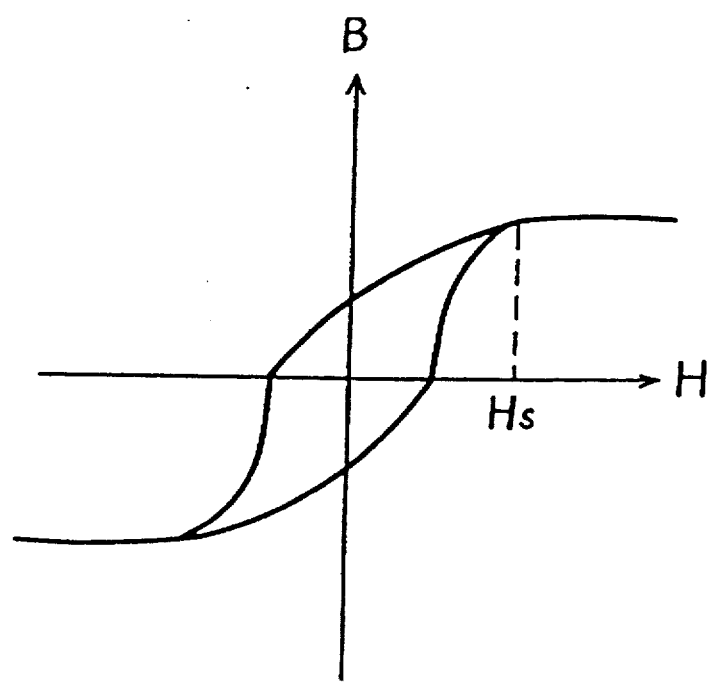
Figure 3A:
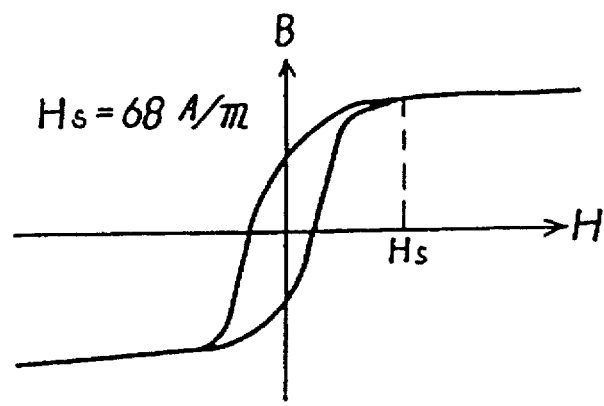
FIG. 3a is a graph indicating a B-H loop of an in-plane isotropic Co-containing amorphous film having a thickness of 2 μm and a saturation magnetic field of Hs=68 A/m.
Figure 3B:
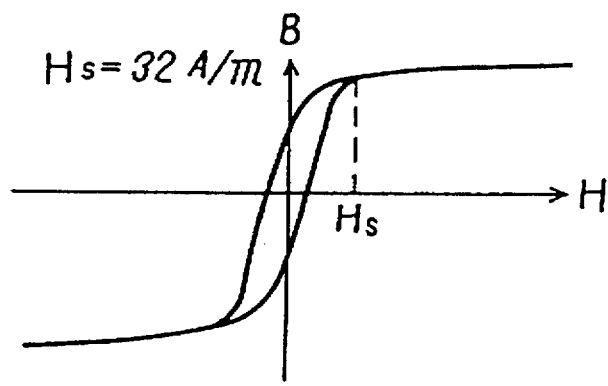
FIG. 3b is a graph similar to FIG. 3a, but obtained when Hs=32 A/m.
Figure 3C:
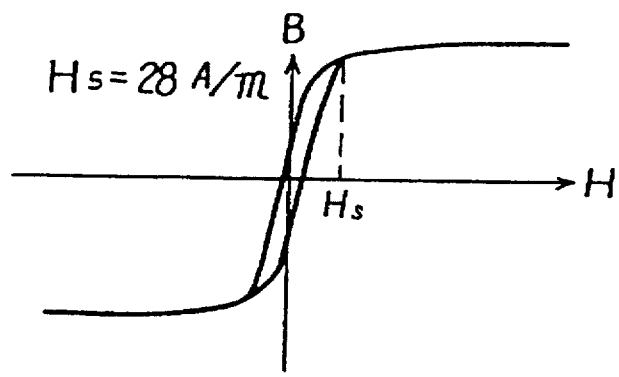
FIG. 3c is a graph similar to FIG. 3a, but obtained when Hs=28 A/m.
Figure 4:
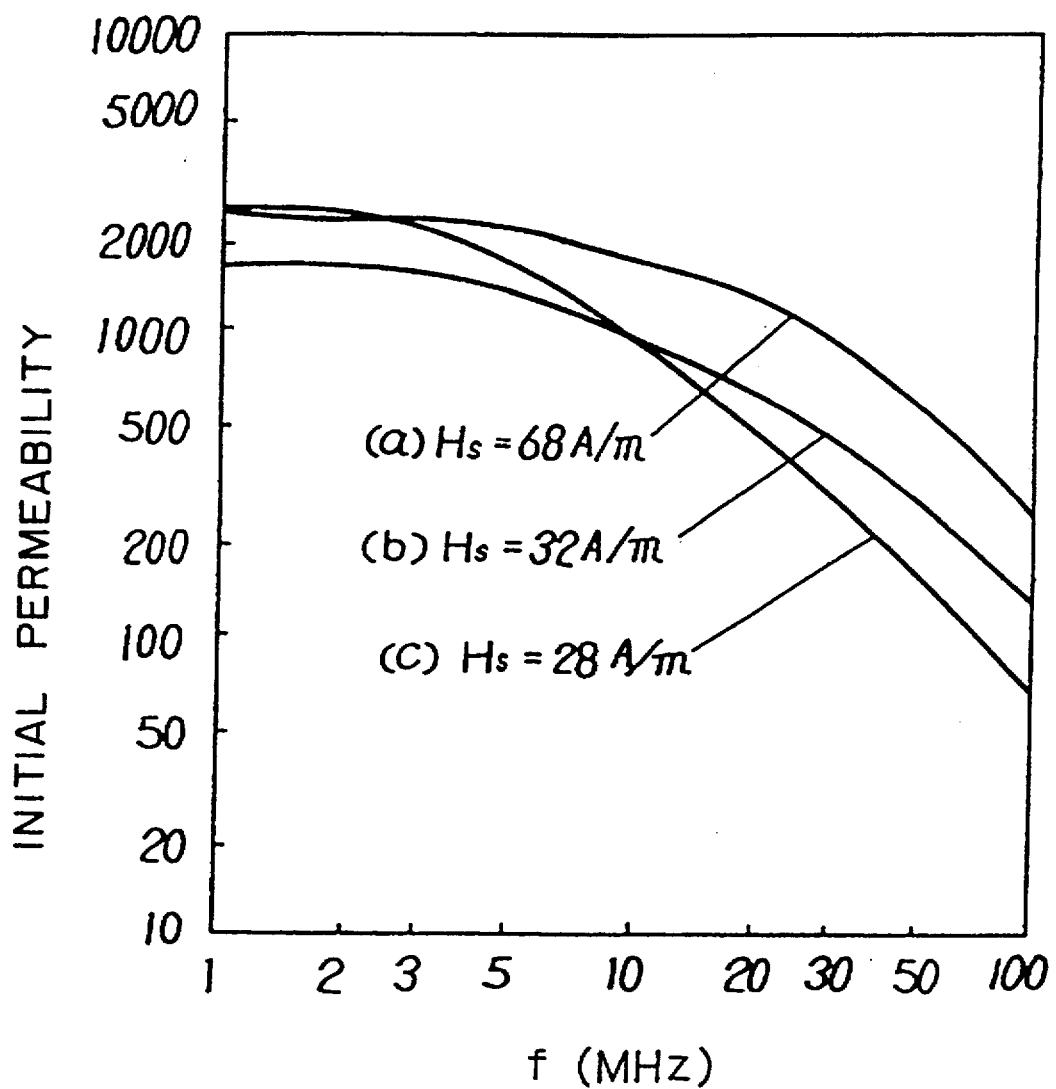
FIG. 4 is a graph indicating frequency characteristics of the initial permeability of in-plane isotropic Co-containing amorphous films having a thickness of 2 μm and different saturation magnetic fields.
Figure 5:
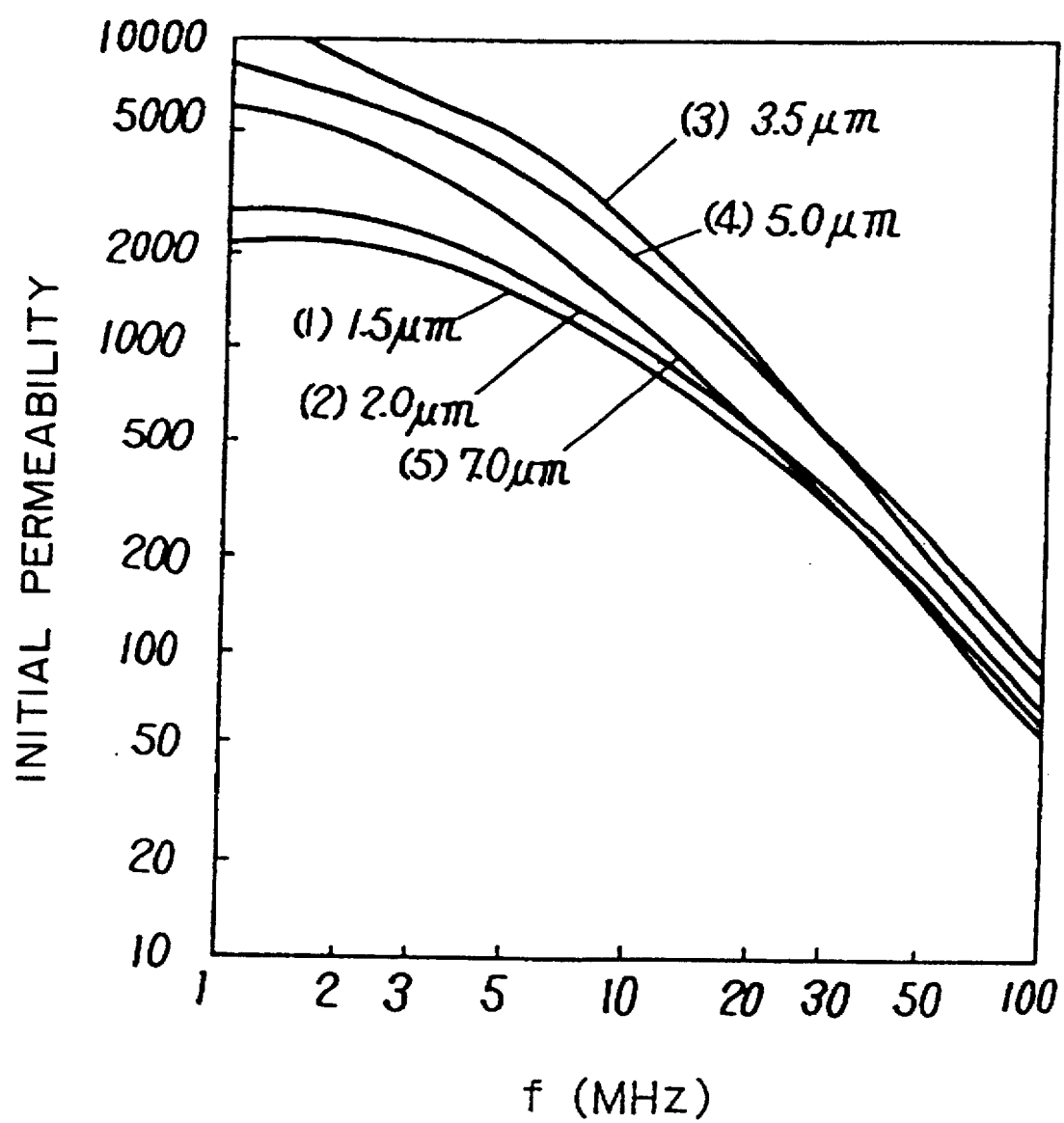
FIG. 5 is a graph indicating frequency characteristics of the initial permeability of the in-plane isotropic Co-containing amorphous films having different thicknesses and a saturation magnetic field of Hs≈20 A/m.
Figure 6:
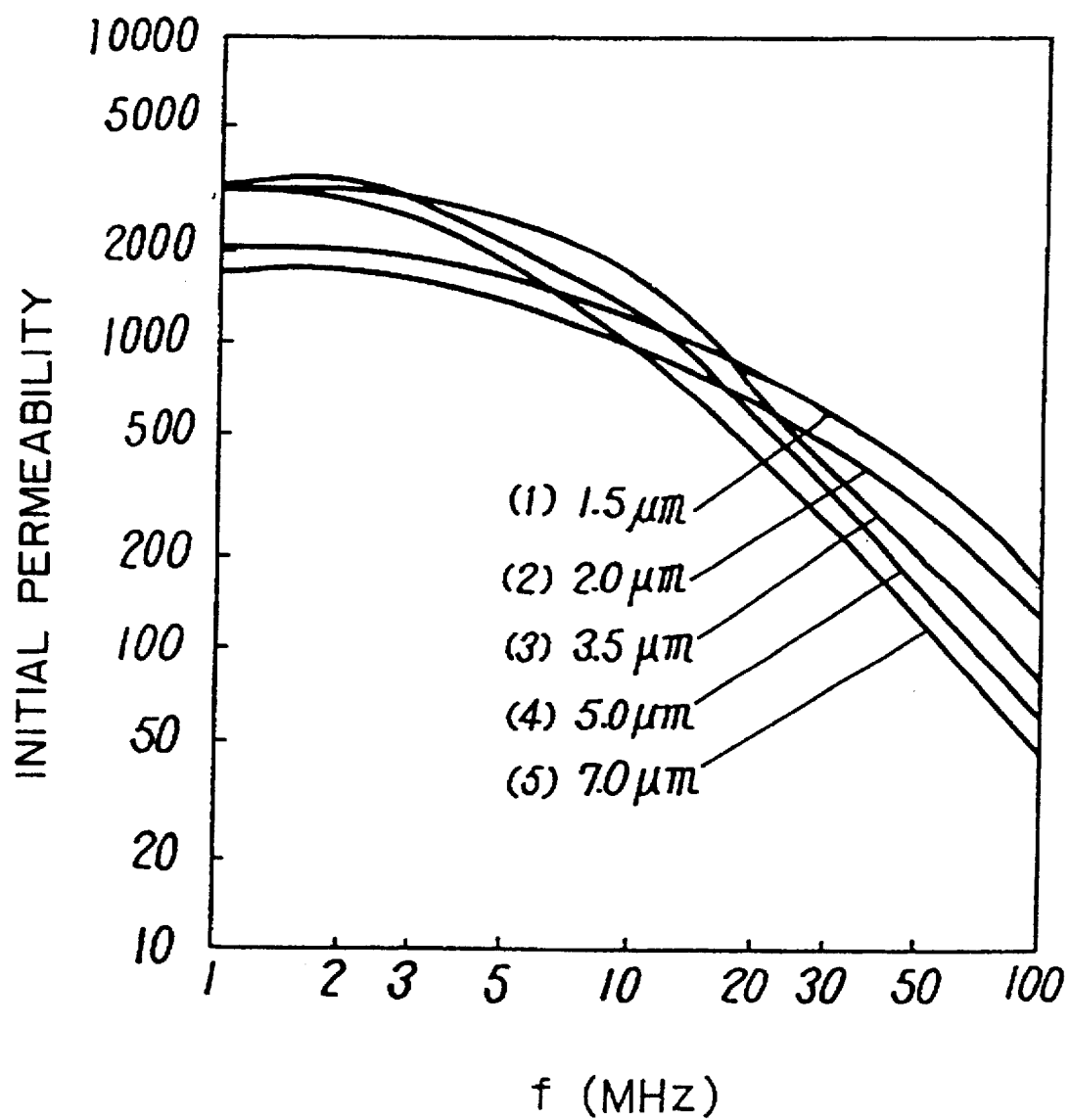
FIG. 6 is a graph similar to FIG. 5, but obtained when Hs≈40 A/m.
Figure 7:
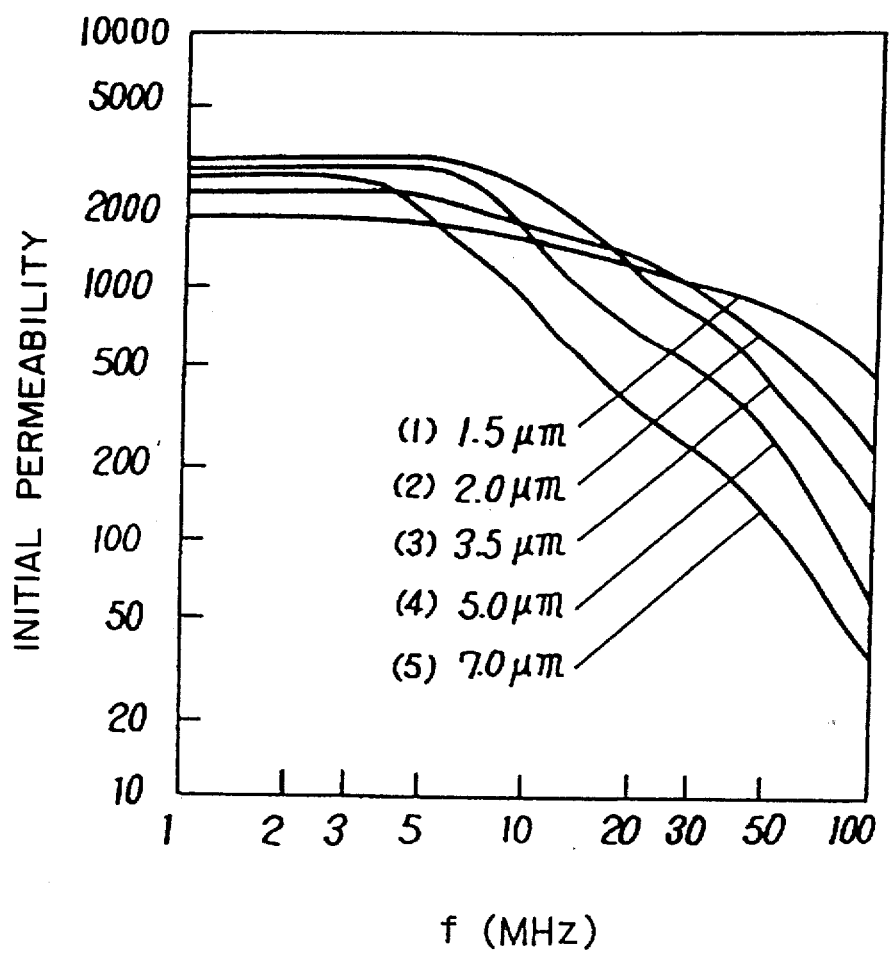
FIG. 7 is a graph similar to FIG. 5, but obtained when Hs≈70 A/m.
Figure 8:
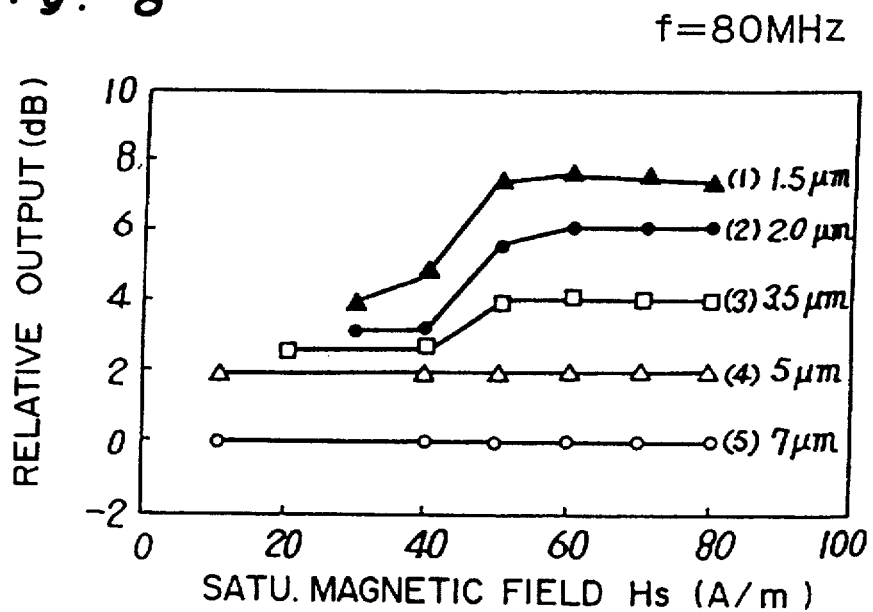
FIG. 8 is a graph indicating relative outputs of the magnetic head at a frequency of 80 MHz when the Hs and the thickness of each metallic magnetic layer were changed.
Figure 9:
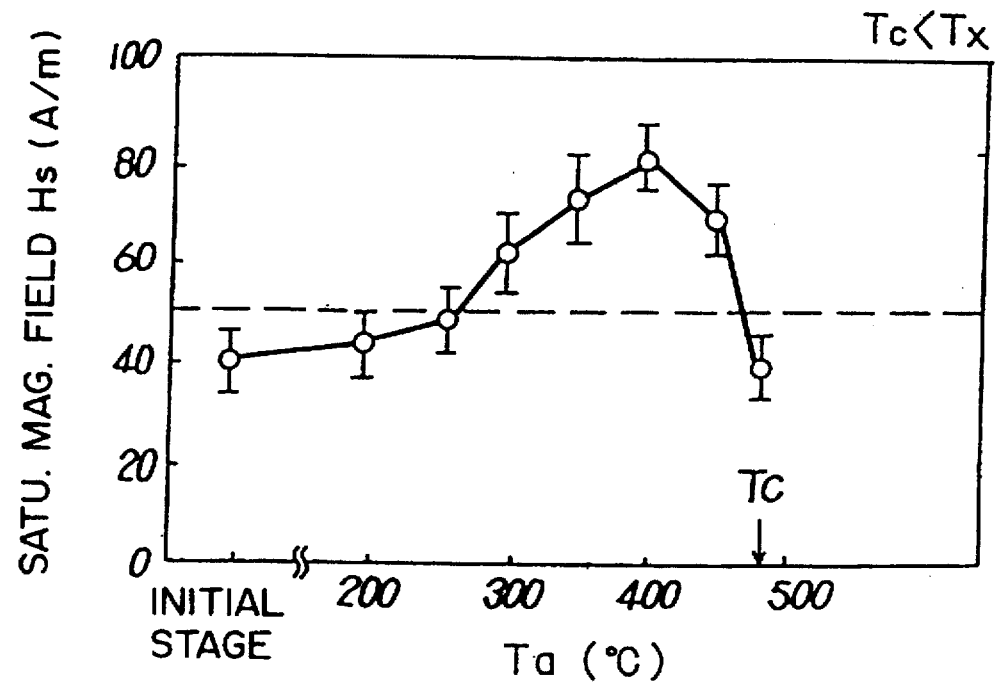
FIG. 9 is a graph indicating a change of the isotropic saturation magnetic field Hs relative to heat-treatment temperatures at which a Co-containing amorphous film having a crystallization temperature Tx greater than the Curie temperature Tc was heat-treated in the absence of any applied magnetic field.
Figure 10:
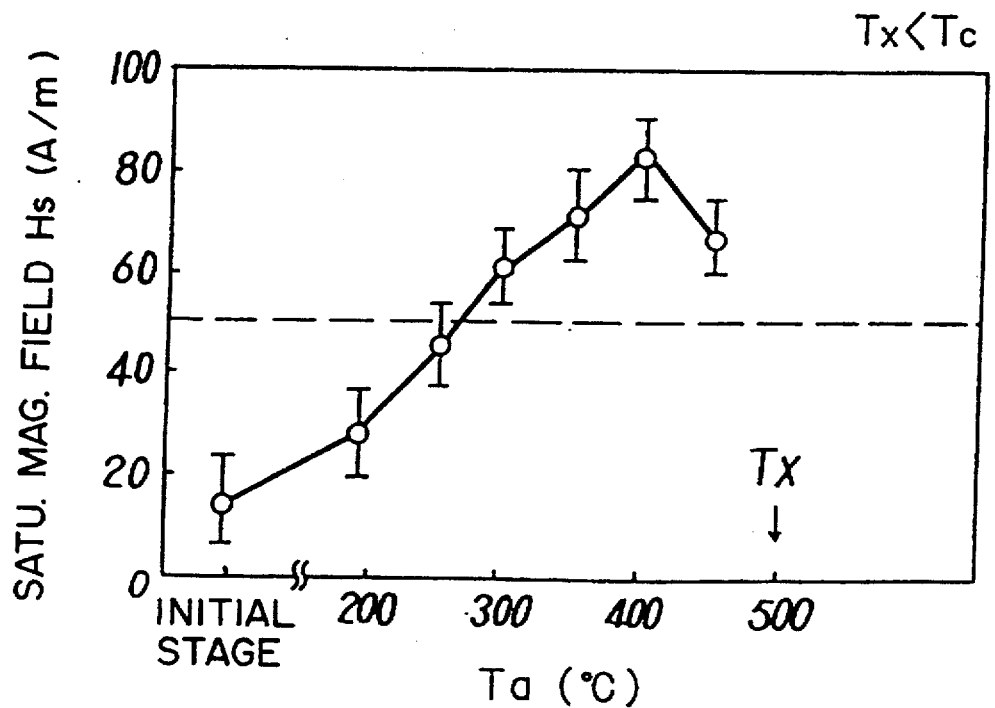
FIG. 10 is a graph similar to FIG. 9, but obtained when a Co-containing amorphous film having a crystallization temperature Tx less than the Curie temperature Tc was heat-treated in the absence of any applied magnetic field.

FIG. 1b depicts, on an enlarged scale, that portion of a magnetic domain structure of the metallic magnetic film 8 which is particularly indicated by A in FIG. 1a. As clearly shown by 7 in FIG. 1b, the magnetic domain structure is locally anisotropic. A locally anisotropic magnetic field Hk is equal in magnitude to an isotropic saturation magnetic field Hs measured from B-H loops in all directions parallel to a magnetic film plane of the magnetic head H.

Table 1 indicates C/N values of the magnetic head of the present invention and those of the conventional magnetic head at a frequency of 80 MHz with a change of the metallic magnetic layer 1 in thickness.

TABLE 1

| Film Structure | C/N(dB) f = 80 MHz | |
|---|---|---|
| | Hs ≈ 40 A/m | Hs ≈ 70 A/m |
| 7 μm × 4 layers | 39 | 39 |
| 5 μm × 6 layers | 40 | 41 |
| 3.5 μm × 8 layers | 41 | 43 |
| 2 μm × 14 layers | 41 | 44 |
| 1.5 μm × 18 layers | 42 | 45 |

(insulating layers: 0.2 μm)

Each of the metallic magnetic layers formed in the magnetic head of the present invention is made of Co-containing amorphous having composition of CoNbZrTa. This amorphous layer has a saturation magnetic flux density of Bs=0.8 T, a Curie temperature of Tc=480° C., and a crystallization temperature of Tx=575° C. The thickness of the SiO2 insulating layer was chosen so as to be 0.2 μm. During the manufacture of the magnetic head, the isotropic saturation magnetic field Hs of the metallic magnetic film was rendered to be about 70 A/m after gap formation by heattreating the metallic magnetic film at 350° C. for two hours in the absence of any applied magnetic field.

On the other hand, the isotropic saturation magnetic field Hs of the conventional magnetic head was about 40 A/m.

As can be known from Table 1, where the metallic magnetic layer has a thickness of not greater than 3.5 μm, the C/V value of the magnetic head according to the present invention is about 2–3 dB higher than that of the conventional one and, hence, the former shows superior high-frequency characteristics. Even when the metallic magnetic layer is made of Co-containing amorphous having Tc greater than Tx, it was confirmed that the magnetic head showed the same result where the isotropic saturation magnetic field of the magnetic film was rendered to be about 70 A/m. Although not shown in Table 1, when the isotropic saturation magnetic field Hs of the magnetic film ranged from 50 to 100 A/m, the magnetic head having a laminated film made up of metallic magnetic layers of a thickness not greater than 3.5 μm showed a C/N value higher than that of the conventional head.

The method of making the magnetic head of the present invention is discussed hereinafter with reference to FIGS. 11 to 17.

Initially, a first substrate 9, a plurality of second substrates 10, and a third substrate were prepared. As shown in FIG. 11, the first substrate 9 comprises a non-magnetic substrate 2 made of, for example, magnesium titanate-containing ceramic or crystallized glass, and an adhesive glass film 4 deposited on one surface of the non-magnetic substrate 2 by sputtering. As shown in FIG. 12, each of the second substrates 10 comprises a non-magnetic substrate 2, a laminated film 8 made up of Co-containing amorphous magnetic layers and SiO2 insulating layers and deposited on one surface of the non-magnetic substrate 2 by sputtering, and an adhesive glass film 4 made of low-melting glass and deposited on the other surface of the non-magnetic substrate 2 by sputtering. As shown in FIG. 13, the third substrate 11 comprises a non-magnetic substrate 2 and a laminated film 8 deposited on one surface of the non-magnetic substrate 2.

Figure 15:
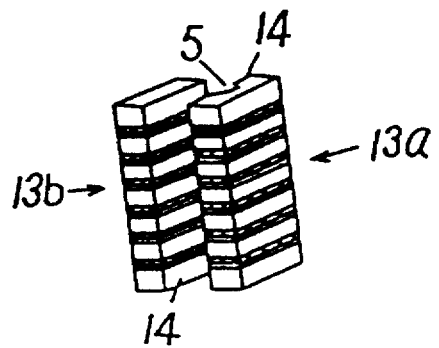
FIG. 15 is a perspective view of two of a plurality of core elements cut from the laminated core block of FIG. 14.
Figure 16:
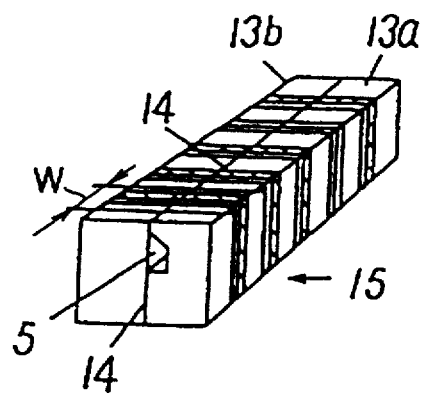
FIG. 16 is a perspective view of the two core elements bonded together.

Thereafter, the plurality of second substrates 10 were stacked one upon another and were sandwiched between the first and third substrates 9 and 11. A subsequent pressure and heat treatment implemented glass bonding to thereby provide a laminated block 12 as shown in FIG. 14. This laminated block 12 was then divided into a plurality of core elements, two of which are shown in FIG. 15 and have opposed inner surfaces each acting as a magnetic gap forming surface 14. Furthermore, one (13a) of the core elements was processed so as to have a coil window 5 defined on the gap surface 14 thereof. The gap surfaces 14 of both of the core elements 13a and 13b were polished to respective smooth surfaces, on each of which gap material made of SiO2 was deposited by sputtering. Thereafter, the two core elements 13a and 13b were brought into contact with each other at respective gap surfaces 14 and were subjected to a pressure and heat treatment, thereby providing a gapped bar 15 as shown in FIG. 16.

According to the present invention, the pressure and heat treatment for preparing the gapped bar 15 was carried out at a temperature of Ta=485° C. not less than Tc where a Co-containing amorphous film having composition of Tc<Tx (Tc=480° C. and Tx=575° C.) was employed as the magnetic film, and at a temperature of Ta=450° C. not greater than Tx where a Co-containing amorphous film having composition of Tc>Tx (Tx=500° C.) was employed as the magnetic film while a rotating magnetic field of 80 kA/m was being applied. Thereafter, regardless of the composition of the amorphous film, the gapped bar 15 was subjected to a heat treatment at a temperature of Ta=350° C. for two hours in the absence of any applied magnetic field, thereby increasing the local anisotropic magnetic field of the magnetic film.

Figure 17:
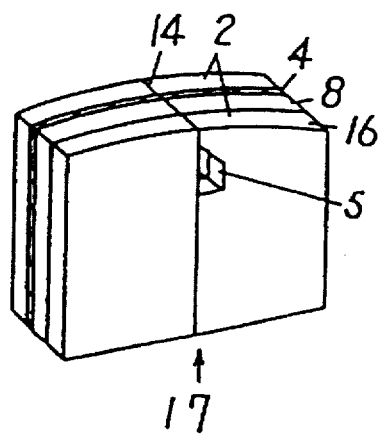
FIG. 17 is a perspective view of the magnetic head according to the present invention.

The gapped bar 15 was then cut into a plurality of core pieces having a predetermined width W, each of which was in turn lapped to provide a complete core 17, shown in FIG. 17, having a desired gap depth and a desired tape sliding surface 16 adjacent to the coil window 5. The complete core 17 thus obtained was incorporated into the magnetic head according to the present invention.

It was confirmed that the isotropic saturation magnetic field Hs of the laminated film of the magnetic core was about 70 A/m, and the magnetic head showed superior high-frequency characteristics as compared with the conventional one.

In this embodiment, although the heat treatment was carried out with respect to the gapped bar at 350° C. for two hours in the absence of any applied magnetic field, substantially the same improvement in high-frequency characteristics could be confirmed in applications where the heat treatment was carried out at a temperature of from 300° C. to 450° C. for a time period over 30 min. in the absence of any applied magnetic field, regardless of whether the composition of the Co-containing amorphous film is Tc<Tx or Tc>Tx.

Furthermore, although the Co-containing amorphous film was employed as the metallic magnetic film in this embodiment, substantially the same effect could be confirmed in applications where a Co-containing nitride film of a superstructure in which nitride layers and non-nitride layers are alternately laminated or a Co-containing nitride film having Tc>Tx was employed as the metallic magnetic film.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A ring-type magnetic head comprising:

a metallic magnetic film having first and second surfaces opposite to each other; and first and second substrates bonded to the first and second surfaces of said metallic magnetic film, respectively, wherein said metallic magnetic film has a saturation magnetic field not less than 50 A/m in all directions parallel to a film plane thereof and wherein a direction of lamination of a sandwich formed by said metallic magnetic film and said first and second substrates is generally perpendicular to a gap-forming surface of the head.

2. The magnetic head according to claim 1, wherein said metallic magnetic film comprises a Co-containing magnetically soft film.

3. The magnetic head according to claim 2, wherein said metallic magnetic film comprises only one metallic magnetic layer having a thickness not greater than 3.5 μm.

4. The magnetic head according to claim 2, wherein said metallic magnetic film comprises a laminated film having at least two metallic magnetic layers and at least one insulating layer laminated alternately with said metallic magnetic layers, and wherein each of said metallic magnetic layers has a thickness not greater than 3.5 μm.

5. The magnetic head according to claim 2, wherein said metallic magnetic film has a crystallization temperature Tx greater than a Curie temperature Tc and is subjected to a heat treatment at a temperature Ta of Tc- 180° C.≦Ta≦Tc-30° C. in the absence of any applied magnetic field.

6. The magnetic head according to claim 2, wherein said metallic magnetic film has a crystallization temperature Tx less than a Curie temperature Tc and is subjected to a heat treatment at a temperature Ta of Tx-200° C.≦Ta≦Tx-50° C. in the absence of any applied magnetic field.

* * * * *